United States Patent
Neville et al.

(10) Patent No.: US 7,938,244 B2
(45) Date of Patent: May 10, 2011

(54) FLEXIBLE LINER FOR HOPPERS OR CHUTES

(75) Inventors: Darrin John Neville, Canningvale (AU); Bradley-John Robert Parker, Atwell (AU); Mark Andrew Salter, Safety Bay (AU)

(73) Assignee: Trelleborg Queensland Rubber Pty. Ltd., Queensland (AU)

( * ) Notice: Subject to any disclaimer, the term of this patent is extended or adjusted under 35 U.S.C. 154(b) by 157 days.

(21) Appl. No.: 11/747,299

(22) Filed: May 11, 2007

(65) Prior Publication Data

US 2008/0053785 A1     Mar. 6, 2008

Related U.S. Application Data

(60) Provisional application No. 60/747,049, filed on May 11, 2006.

(51) Int. Cl.
*B65G 11/16* (2006.01)
(52) U.S. Cl. ..................... 193/25 R; 198/391
(58) Field of Classification Search ........... 193/25 R
See application file for complete search history.

(56) References Cited

U.S. PATENT DOCUMENTS

| | | | | |
|---|---|---|---|---|
| 3,099,494 A | * | 7/1963 | Heinze | 406/136 |
| 5,244,069 A | | 9/1993 | Cosgrove | |
| 5,921,369 A | * | 7/1999 | Steele | 193/25 R |

FOREIGN PATENT DOCUMENTS

| | | |
|---|---|---|
| AU | 2003213870 | 10/2003 |
| AU | 2004202731 | 4/2005 |
| AU | 2007100172 | 3/2007 |

* cited by examiner

*Primary Examiner* — Gene Crawford
*Assistant Examiner* — Kavel Singh
(74) *Attorney, Agent, or Firm* — Howard & Howard Attorneys PLLC

(57) ABSTRACT

A flexible liner (10) for a hopper or chute (40) has a plurality of overlapping flexible liner panels or tiles (20) secured to the walls (41,42) of the hopper or chute (40) by fixing strips (30). Each flexible liner panel or tile (20) has an elongate body (21) and a flexible fin or flap (22) formed integrally of elastomeric material, where the flexible fin or flap (22) extends at an acute included angle ($\alpha$) (in the direction of flow of material through the hopper or chute (140)) to the side walls (41,42) and the Shore A hardness of the elongate body 21) is equal to, or greater than, the Shore A hardness of the flexible fin or flap (22).

22 Claims, 4 Drawing Sheets

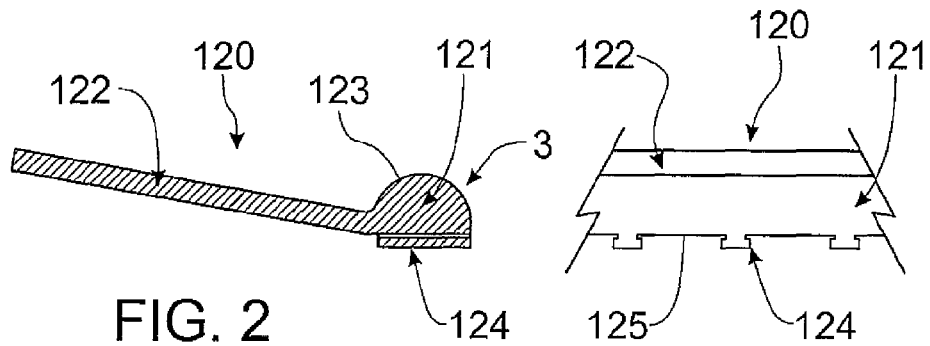
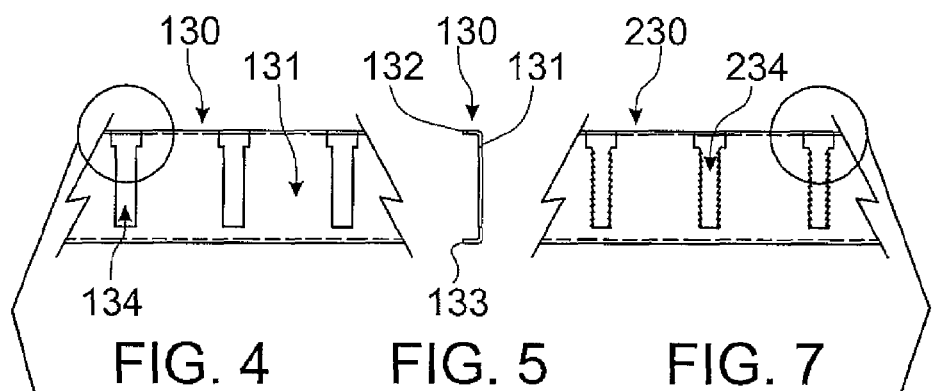
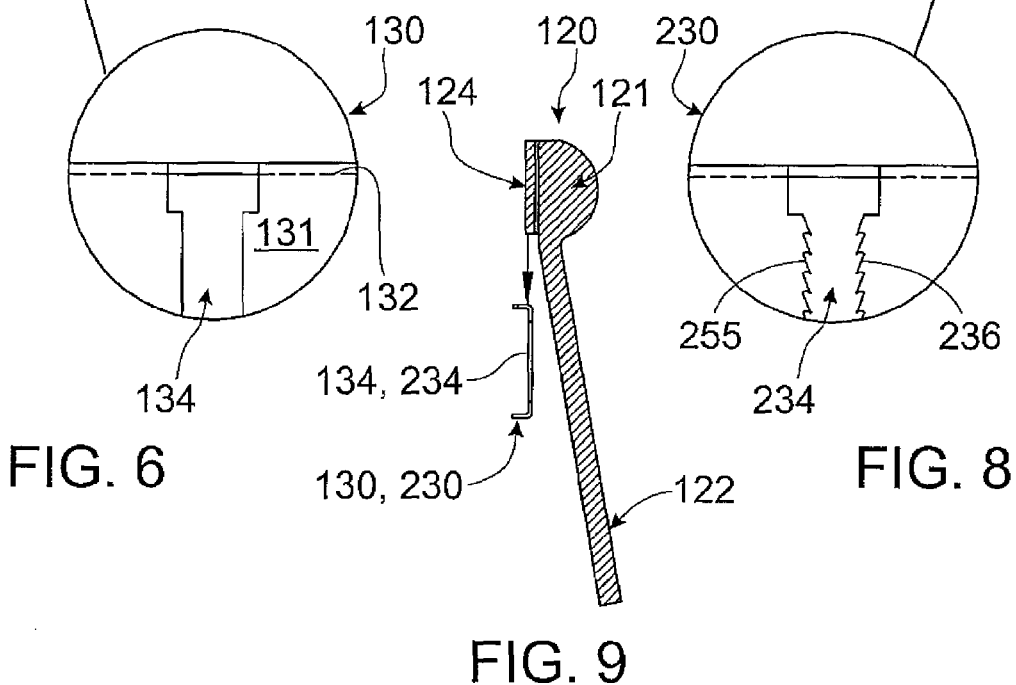

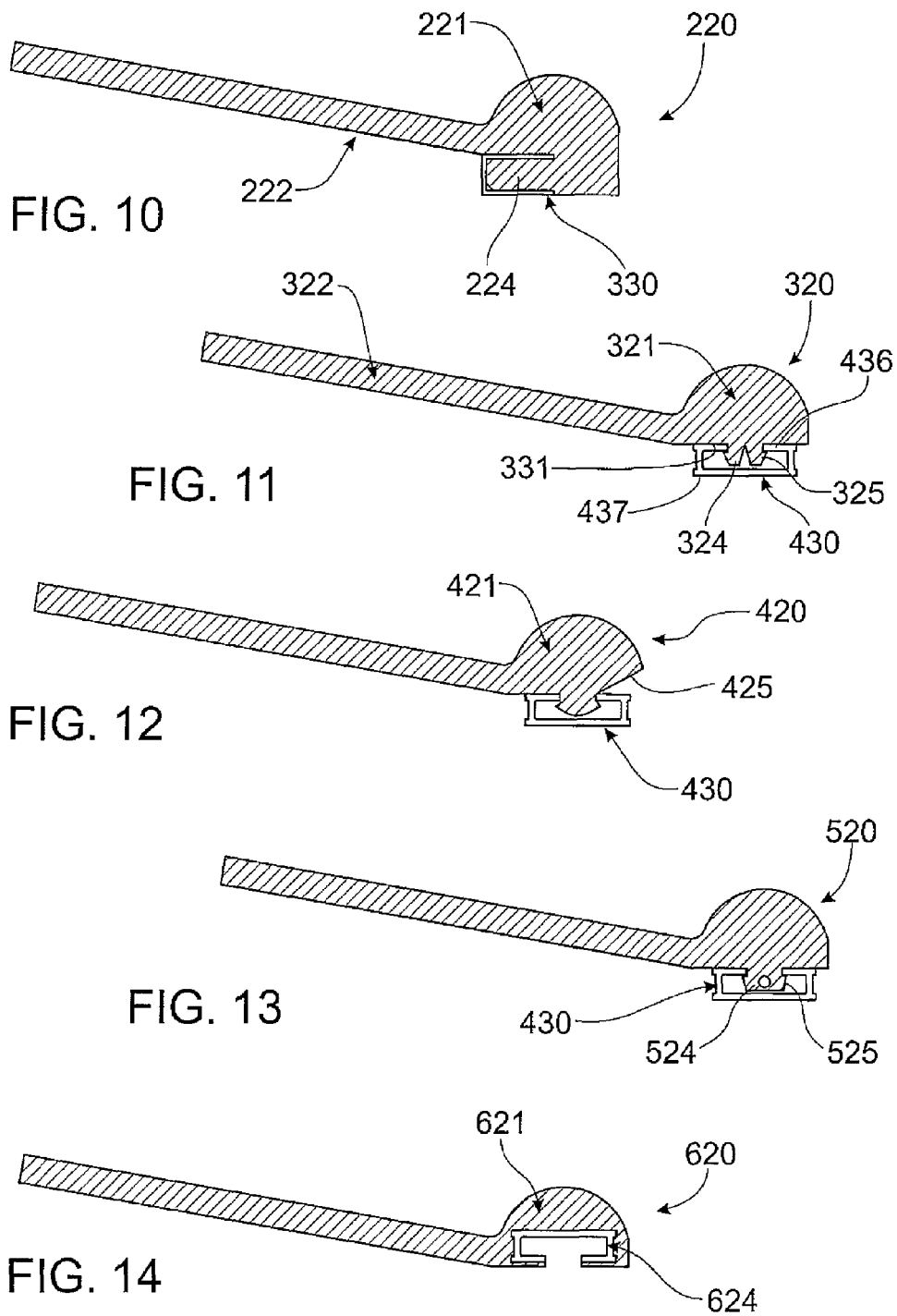

FLEXIBLE LINER FOR HOPPERS OR CHUTES

CROSS REFERENCE TO RELATED APPLICATIONS

The present application claims priority to U.S. provisional patent application 60/747,049, filed May 11, 2006, and is incorporated herein by reference in its entirety.

BACKGROUND OF THE INVENTION

1. Field of the Invention

THIS INVENTION relates to a flexible liner system for hoppers or chutes and like bulk materials handling equipment.

2. Prior Art

Hoppers and chutes are commonly used in the handling or transport of the bulk materials to storage containers, the inlets for conveyors for elevators, transport vehicles, or the like.

Some bulk materials, including ores which contain moisture, have a tendency to stick in the hoppers or chutes and eventually block the flow.

The flow of the bulk materials through the hoppers or chutes causes wear to the panels of the hoppers or chutes, requiring periodic repair or replacement of the panels, which can result in considerable down-time and expense.

SUMMARY OF THE PRESENT INVENTION

It is an object of the present invention to provide a flexible liner to facilitate the continuous flow of bulk handling materials through chutes and hoppers and like bulk materials handling equipment.

It is a preferred object of the present invention to provide a flexible liner which uses the energy of the bulk materials to activate movement in flexible portion(s) of the flexible liner to lessen, or prevent, "sticking" of the bulk materials to the walls of the hoppers or chutes.

It is a further preferred object of the present invention to provide a flexible liner incorporating panels/tiles which can also act as a replaceable liner for the hoppers or chutes.

It is a still further preferred object of the present invention to provide a flexible liner where affected panels or tiles can be easily replaced as necessary (eg., by a single person, complying with relevant workplace health and safety (WH&S) weight restrictions).

It is a still further preferred object of the present invention to provide a flexible liner where alternative fixing arrangements are provided to mount the panels or tiles on the walls of the hoppers or chutes.

In one aspect, the present invention resides in a flexible liner panel or tile for a hopper or chute or other bulk materials handling equipment including:

an elongate body having mounting means releasably engageable with fixing means on a wall of the hopper or chute; and at least one flexible fin or flap extending from the elongate body and operable, in use, to extend at an acute included angle to the wall of the hopper or chute in a downstream direction of flow of material through the hopper or chute.

In a second aspect, the present invention resides in a flexible liner for a hopper or chute or other bulk materials handling equipment including:

a plurality of fixing means provided at parallel, regularly spaced, locations on a wall, or walls, of the hopper or chute; and a plurality of flexible liner panels or tiles, each liner panel or tile having an elongate body with mounting means releasably engaged with a respective one of the fixing means, and at least one flexible fin or flap extending from the elongate body at an acute included angle to an adjacent one of the wall or walls of the hopper or chute in a downstream direction of flow of the material through the hopper or chute.

Preferably, the elongate body and the or each flexible fin or flap of each liner panel or tile are manufactured from elastomeric material, such as natural rubber, synthetic rubber, plastics material, or a combination of two or more of those materials, which may be reinforced with reinforcing fibres and/or reinforcing strips.

Preferably, the liner panels or tiles can be coated on the material contact face with plastics material, such as PTFE, polyurethane, polyethylene, or other low-friction material.

Preferably, the elongate body of each liner panel or tile has a hardness which is equal to, or greater than, the hardness of the or each flexible fin or flap.

Preferably, the elongate body has a Shore Durometer A hardness in the range of 40-90; while the or each flexible fin or flap may have a Shore Durometer A hardness in the range of 40-65.

The respective hardnesses for the elongate body and the flexible fin or flap will be dependent on the intended application for the liner panel or tile.

The mounting means of the elongate body of a liner panel or tile may include a plurality of (preferably equally spaced) headed extensions engageable in complementary slots or holes in the fixing means; an elongate slot to receive a side wall of a channel-shaped fixing means; a channel-shaped member (eg., of metal or stiff plastics material) enclosed within the elongate body to engage a substantially T-shaped fixing rail; or other suitable mounting means.

Preferably, the fixing means are secured to the wall, or walls, of the hopper or chute, so that the or each flexible fin or flap of one liner panel or tile overlies the elongate body of an adjacent liner panel or tile (in the downstream direction) intermediate (ie., adjacent the centre line of) the or each flexible fin or flap.

Preferably, at rest, the or each flexible fin or flap of the one liner panel or tile is spaced a small distance (eg., up to 10 mm) above the elongate body of the adjacent liner panel or tile; and, in use, the elongate body of the adjacent liner panel or tile forms a "line of deflection" for the or each flexible fin or flap of the one liner panel or tile.

BRIEF DESCRIPTION OF THE DRAWINGS

To enable the invention to be fully understood, a number of preferred embodiments will now be described with reference to the accompanying drawings, in which:

FIG. 2 is a sectional side elevational view of a liner panel or tile in accordance with a second embodiment of the present invention;

FIG. 3 is a top plan view of the liner panel or tile (taken in the direction of arrow 3 in FIG. 2);

FIG. 4 is a front elevational view of a first embodiment of the fixing means;

FIG. 5 is a sectional side elevational view thereof;

FIG. 6 is a front elevational view of one of the slots in the fixing means of FIG. 4, on a larger scale;

FIG. 7 is a front elevational view of a second embodiment of the fixing means;

FIG. 8 is a front elevational view of one of the slots of the second embodiment of the fixing means of FIG. 7, on a larger scale;

FIG. 9 is a sectional side elevational view showing the method of engaging the liner panel or tile of the second embodiment with the fixing means of the first or second embodiments;

FIG. 10 is a sectional side elevational view of a third embodiment of the liner panel or tile with a third embodiment of the fixing means;

FIG. 11 is a sectional side elevational view of a fourth embodiment of the liner panel or tile and the fourth embodiment of the fixing means;

FIGS. 12 and 13 are similar views of fifth and sixth embodiments of the liner panel and tile with the fourth embodiment of the fixing means;

FIG. 14 is a sectional side elevational view of a seventh embodiment of the liner panel or tile.

DETAILED DESCRIPTION OF THE DRAWINGS

Figure 1:
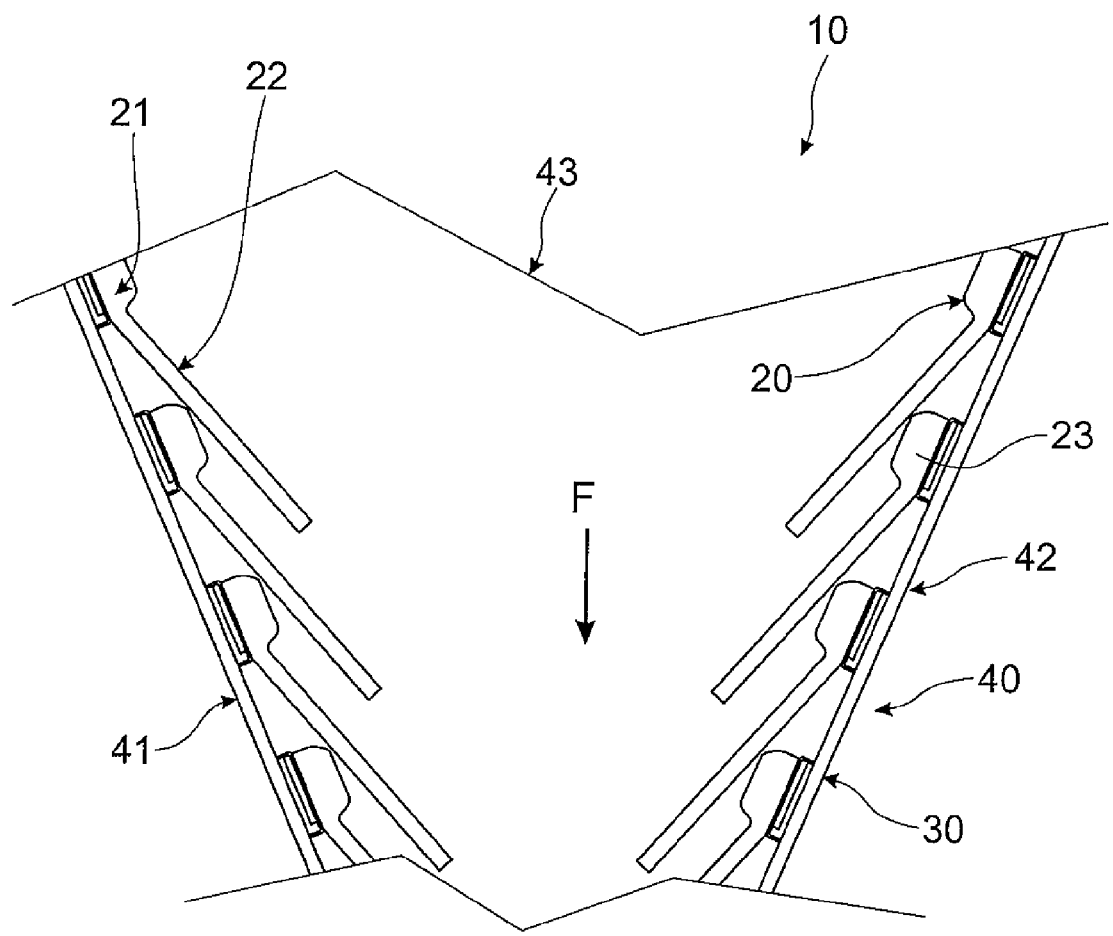
FIG. 1 is a sectional side elevational view of a square or rectangular hopper or chute provided with liner panels or tiles of a first embodiment of the present invention, the liner panels or tiles of the rearmost wall being omitted for clarity.

As shown in FIG. 1, the liner system 10 comprises a plurality of "overlapping" liner panels or tiles 20, secured via fixing means 30 to the side walls 41, 42 of a square or rectangular hopper or chute 40. (Liner panels or tiles 20 are provided on the front wall (not shown) and the rear wall 43, where the liner panels or tiles 40 on the rear wall 43 have been omitted for clarity.) Liner panel or tile 20 of a first embodiment has an elongate body 21 and a flexible fin or flap 22 will be hereinafter described in more detail. It will be noted that the flow of bulk material through the chute or hopper 40 will be in the direction of arrow F; where the flexible fin or flap 22 of one liner panel or tile 20 overlies the elongate body 21 of the adjacent liner panel or tile 20 in the downstream direction.

As shown, the flexible fin or flap 22 will overlie the elongate body 21 intermediate the flexible fin or flap 22, preferably in the range of 50-90% of the height of the flexible fin or flap 22. The elongate body 21 of the adjacent liner panel or tile 20 provides a "line of deflection" for the flexible fin or flap 22 of the liner panel or tile 20 immediately upstream thereof.

Referring to FIG. 1, the elongate body 21 of each liner panel or tile 20 is shown with a substantially planar material contact face 23, but this face 23 may preferably be convexly curved, as will be hereinafter described.

Referring to FIGS. 2 and 3, the liner panel or tile 120 of the second embodiment (with a convex material contact face 123) and a flexible fin or flap 122 integrally moulded or extruded from natural or synthetic rubber with a Shore Durometer A hardness range of 40-65.

Mounting means in the form of a plurality of equally spaced, substantially T-section lugs extend from a rear face 125 (of the elongate body 121) to provide the mounting means for engagement with the first or second embodiments of the fixing means 130, 230 to be hereinafter described with reference to FIGS. 4 to 6, and 7 and 8.

Referring to FIGS. 4 to 6, the first embodiment of the fixing means 130 has a channel section metal body 131 where flanges 132, 133 are welded (or otherwise fixed) to the walls (41, 42, 43) of the hopper or chute 40.

Slots 134 are provided in the metal body 131 and top flange 132 at the same spacing as the mounting means 124 on the liner panel or tile 120 to enable the T-shaped mounting means 124 to be engaged (in overlapping configuration shown in FIG. 1) on the walls (41, 42, 43) of the hopper or chute 40.

In the second embodiment of the fixing means 230, the side walls 235, 236 of the slots 234 are provided with teeth arranged to prevent the release from the slots 234.

As shown in FIG. 9, downward movement of the liner panel or tile 120 to insert the T-shaped mounting means 124 into the slots 134, 234 of the fixing means 130, 230 enables elongate body 121 to be secured to the fixing means 130, 230.

NB: The liner panel or tile 120 can be released, eg., for replacement, from the fixing means 130, 230 by movement of the elongate body 121 in a direction lateral to the fixing means 130, 230.

Liner panel or tile 220 of the third embodiment, illustrated in FIG. 10, has a downwardly-directed flange or strip 224 on the elongate body 221 for engagement in a substantially U-shaped channel forming the fourth embodiment 330 of the fixing means to releasably secure the elongate body 221 to a respective wall of the hopper or chute 40.

In this embodiment, the elongate body 321 and the flange of the mounting means 224 may be manufactured, eg., by moulding or extrusion, from natural or synthetic rubber (and/or plastics material) of Shore Durometer A hardness, eg., in the range of 65-90, where reinforcing fibres may be provided in the elongate body 221 and mounting means 224. The flexible fin or flap 222 may be manufactured from natural or synthetic rubber of Shore Durometer A hardness in the range 40-65, depending on the intended application.

In the panel or tile 320 of the fourth embodiment, illustrated in FIG. 11, the elongate body 320 and flexible fin or flap 322 are manufactured of the same/similar materials as for the liner panel or tile 220.

In this embodiment, the mounting means 324 comprise a plurality of spigots, or a continuous linear spigot, with locking head(s) received in complementary holes in the front wall 436 of a hollow rectangular metal fixing means 430, the rear wall 437 of which is fixed, e.g., by welding or rivets to a respective wall of the hopper or chute 40.

The liner panel or tile 420 of a fifth embodiment (of FIG. 12) is of similar construction to the liner panel or tile 320 of the fourth embodiment (and is engageable with the fixing means 430 of the fifth embodiment); but the elongate body 420 has an upwardly inclined face 425 to allow the elongate body 420 to pivot or "rock" relative to the fixing means 430.

The liner panel or tile 520 of a sixth embodiment (of FIG. 13) is also of similar construction to the liner panel or tile 320 of the fourth embodiment, except that the head 525 of the mounting means 524 is solid, with an internal recess to allow compression of the head 525 as it is inserted into the fixing means 430.

Figure 15:
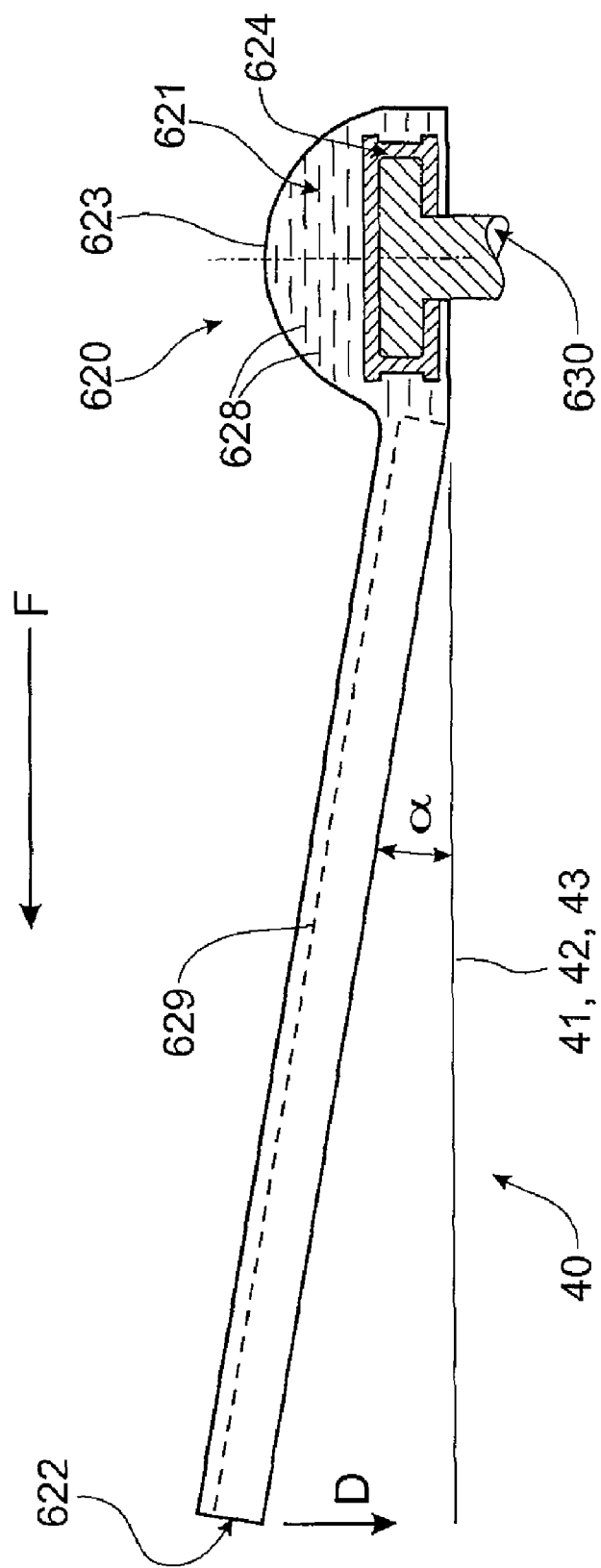
FIG. 15 is a side elevational view of the seventh embodiment of the liner panel or tile and a fifth embodiment of the fixing means.

The liner panel or tile 620 of the seventh embodiment, illustrated in FIGS. 14 and 15, has an elongate body 621 where the mounting means 624 comprises a metal or stiff-plastics channel section enclosed within the elongate body 621 to engage a respective T-shaped rail as the fixing means 630 of a seventh embodiment.

As illustrated in FIG. 15, the elongate body 621 incorporates reinforcing fibres 628 to increase the Shore Durometer A hardness of the elongate body 621 compared to the hardness of the flexible fin or flap 622.

In addition, a low-friction coating 629 (eg., of PTFE, polyurethane or polyethylene) may be applied to the material contact face of the flexible fin or flap 622 (and the corresponding space of the elongate body 621).

The flexible fin or flap 622 is provided at an acute included angle α to the adjacent side wall 41, 42, 43 of the hopper or chute 40 so that as material flows in the direction of arrow F in FIG. 15, the flexible fin or flap 62 may be deflected towards the adjacent side wall 41, 42, 43 in the direction of arrow D.

The flexing/deflection of the flexible fins or flaps 22, 122, 222, 322, 422, 522, 622, uses the energy of the material flowing through the hopper or chute 40, in the direction of arrow F, to activate movement of the flexible fins or flaps to lessen, and prevent, "sticking" of the materials to the walls 41, 42, 43 of the hopper or chute 40 and hence facilitate product flow.

In addition, the panels or tiles 20, 120, 220, 320, 420, 520, 620, act as a replaceable wear liner for the hopper or chute 40 and are easily replaced as necessary to thereby greatly extend the life of the hopper or chute 40.

As illustrated, a number of alternative fixing arrangements may be used which enable it to be very easy to fit the liner panels or tiles to the chute or hopper, compared with a "bolt it on" approach.

Preferably, the liner panels or tiles are manufactured to a length of 600 mm-1000 mm to enable them to be easily handled by one man; but they can be made to any length.

In one preferred example, the flexible fin or flap 622 extends approximately 425 mm from the elongate body 621 and the included angle α is 10°. However, the dimensions and angle can be readily varied to suit the particular intended installation, eg., α=5-15°.

Where the liner panels or tiles are manufactured of all rubber construction, they are suitable for reprocessing into scrap rubber using available technologies and existing processing plants when their useful life has expired.

The construction of the liner panels and tiles, and the complementary fixing means, makes it possible for a single man to fit and replace a liner panel or tile at any location in the chute or hopper 40. It removes the necessity of scaffolding on the external side of the hopper or chute 40 and the associated labour for the initial installation and subsequent changing of the liner panels or tiles.

Furthermore, the light weight of the liner panels or tiles in the liner system makes it possible for the liner system to be serviced by one man.

The performance of the liner system can be varied for different materials by:

a) changing the vertical spacing of the liner panels or tiles and hence the tile angle;

b) varying the hardness of the materials in the liner panels or tiles; and c) varying the relative hardness of the elongate body and the flexible fin or flap in the liner panels or tiles.

The liner system hereinbefore described can easily be retrofitted into any existing hoppers or chutes, with access only required to the inside of the hopper or chute 40; or may be provided on an original equipment manufacture (OEM) basis for new hoppers or chutes 40.

The embodiments described and illustrated are by way of illustrative examples only and modifications and changes may be made thereto without departing from the present invention.

We claim:

1. A flexible liner panel or tile for a hopper or chute or other bulk materials handling equipment, comprising:
    an elongate body having mounting means releasably engageable with fixing means on a wall of the hopper or chute; and
    at least one flexible fin or flap extending from the elongate body and operable, in use, to extend at an acute inclined angle to the wall of the hopper or chute in a downstream direction of flow of material through the hopper or chute, the elongate body means being releasably securable to a wall of the hopper or chute, so that the at least one flexible fin or flap of one liner panel or tile overlies an elongate body of an adjacent liner panel or tile, in the downstream direction, intermediate or adjacent the centre line of the or each flexible fin or flap, and wherein at rest, the or each flexible fin or flap of the one liner panel or tile is spaced above the elongate body of the adjacent liner panel or tile and, in use, the elongate body of the adjacent liner panel or tile forms a line of deflection for the or each flexible fin or flap of the one liner panel or tile, the line of deflection forming a fulcrum within the or each flexible fin or flap such that material flowing through the hopper or chute causes a portion of the flexible fin or flap downstream of the line of deflection to flex.

2. A flexible liner for a hopper or chute or other bulk materials handling equipment, comprising:
    a plurality of fixing means provided at parallel, regularly spaced, locations on a wall, or walls, of the hopper or chute; and
    a plurality of flexible liner panels or tiles, each liner panel or tile having an elongate body with mounting means releasably engaged with a respective one of the fixing means, and at least one flexible fin or flap extending from the elongate body at an acute angle to an adjacent one of the wall, or walls, of the hopper or chute in a downstream direction of flow of the material through the hopper or chute, the fixing means being secured to the wall (or walls) of the hopper or chute, so that the or each flexible fin or flap of one liner panel or tile overlies the elongate body of an adjacent liner panel or tile, in the downstream direction, intermediate or adjacent the centre line of the or each flexible fin or flap, and wherein at rest, the or each flexible fin or flap of the one liner panel or tile is spaced above the elongate body of the adjacent liner panel or tile and, in use, the elongate body of the adjacent liner panel or tile forms a line of deflection for the or each flexible fin or flap of the one liner panel or tile, the line of deflection forming a fulcrum within the or each flexible fin or flap such that material flowing through the hopper or chute causes a portion of the flexible fin or flap downstream of the line of deflection to flex.

3. A flexible liner as claimed in claim 2, wherein:
the elongate body and the or each flexible or flap of each liner panel or tile are manufactured from elastomeric material, such as natural rubber, synthetic rubber, plastics material, or a combination of two or more of those materials.

4. A flexible liner as claimed in claim 3, wherein:
the elastomeric material is reinforced with reinforcing fibres and/or reinforcing strips.

5. A flexible liner as claimed in claim 2, wherein:
each liner panel or tile is coated on a material contact face with a plastics material, such as PTFE, polyurethane, polyethylene, or other low-friction material.

6. A flexible liner as claimed in claim 2, wherein:
the elongate body of each liner panel or tile has a hardness which is equal to, or greater than, the hardness of the or each flexible fin or flap.

7. A flexible liner as claimed in claim 6, wherein:
the elongate body has a Shore Durometer A hardness in the range of 40-90; while the or each flexible fin or flap has a Shore Durometer A hardness in the range of 40 -65.

8. A flexible liner as claimed in claim 2, wherein:
the mounting means of the elongate body of a liner panel or tile includes a plurality of equally spaced headed extensions engageable in complementary slots or holes in the fixing means; or an elongate slot to receive a side wall of a channel-shaped fixing means; or a channel-shaped member of metal or stiff plastics material enclosed within the elongate body to engage a substantially T-shaped fixing rail.

9. A flexible liner as required in claim 2, wherein at least 50% of the flexible fin or flap overlies the elongate body of the adjacent panel or tile in the downstream direction.

10. A flexible liner as claimed in claim 2, wherein:
at rest, the or each flexible fin or flap of the one liner panel or tile is spaced up to 10 mm above the elongate body of the adjacent liner panel or tile.

11. A flexible liner as claimed in claim 2, wherein:
each liner panel or tile has a length in the range of 600-1000 mm and the acute included angle is in the range of 5-15°.

12. A flexible liner for a material handling device, comprising:
a plurality of mounting devices provided at parallel, regularly spaced, locations on a wall of the material handling device; and
a plurality of flexible liner elements having an elongate portion and a flexible portion, the elongate portion being releasably engaged with a respective one of the mounting devices, the flexible portion extending from the elongate body at an acute angle to a wall of the material handling device in a downstream direction of flow of the material, the elongate portion being secured to the wall so that the flexible portion of one liner element overlies the elongate portion of an adjacent liner element in the downstream direction, and in use, the elongate portion of the adjacent flexible liner element forms a line of deflection for the or each flexible fin or flap of the one liner panel or tile, the line of deflection forming a fulcrum within the or each flexible fin or flap such that material flowing through the hopper or chute causes a portion of the flexible fin or flap downstream of the line of deflection to flex.

13. A flexible liner, as set forth in claim 12, wherein at least 50% of the flexible portion of the one liner element overlies the elongate portion of the adjacent liner element.

14. A flexible liner panel or tile, as set forth in claim 1, where material flowing through the hopper or chute causes a portion of the flexible fin or flap downstream of the line of deflection to flex in an outward direction.

15. A flexible liner, as set forth in claim 2, where material flowing through the hopper or chute causes a portion of the flexible fin or flap downstream of the line of deflection to flex in an outward direction.

16. A flexible liner, as set forth in claim 12, where material flowing through the hopper or chute causes a portion of the flexible fin or flap downstream of the line of deflection to flex in an outward direction.

17. A flexible liner panel or tile, as set forth in claim 1, where flexing of the flexible fin or flap is not caused by an external airflow.

18. A flexible liner, as set forth in claim 2, where flexing of the flexible fin or flap is not caused by an external airflow.

19. A flexible liner, as set forth in claim 12, where flexing of the flexible fin or flap is not caused by an external airflow.

20. A flexible liner panel or tile for a hopper or chute or other bulk materials handling equipment, comprising:
an elongate body having mounting means releasably engageable with fixing means on a wall of the hopper or chute; and
at least one flexible fin or flap extending from the elongate body and operable, in use, to extend at an acute inclined angle to the wall of the hopper or chute in a downstream direction of flow of material through the hopper or chute, the elongate body means being releasably securable to a wall of the hopper or chute, so that the at least one flexible fin or flap of one liner panel or tile overlies, and is in contact with, an elongate body of an adjacent liner panel or tile, in the downstream direction, intermediate or adjacent the centre line of the or each flexible fin or flap, and wherein at rest, the or each flexible fin or flap of the one liner panel or tile is spaced above the elongate body of the adjacent liner panel or tile and, in use, the elongate body of the adjacent liner panel or tile forms a line of deflection for the or each flexible fin or flap of the one liner panel or tile such that only material flowing through the hopper or chute causes a portion of the flexible fin or flap downstream of the line of deflection to flex, where flexing of the flexible fin or flap is not caused by an external source of airflow.

21. A flexible liner for a hopper or chute or other bulk materials handling equipment, comprising:
a plurality of fixing means provided at parallel, regularly spaced, locations on a wall, or walls, of the hopper or chute; and
a plurality of flexible liner panels or tiles, each liner panel or tile having an elongate body with mounting means releasably engaged with a respective one of the fixing means, and at least one flexible fin or flap extending from the elongate body at an acute angle to an adjacent one of the wall, or walls, of the hopper or chute in a downstream direction of flow of the material through the hopper or chute, the fixing means being secured to the wall (or walls) of the hopper or chute, so that the or each flexible fin or flap of one liner panel or tile overlies, and is in contact with, the elongate body of an adjacent liner panel or tile, in the downstream direction, intermediate or adjacent the centre line of the or each flexible fin or flap, and wherein at rest, the or each flexible fin or flap of the one liner panel or tile is spaced above the elongate body of the adjacent liner panel or tile and, in use, the elongate body of the adjacent liner panel or tile forms a line of deflection for the or each flexible fin or flap of the one liner panel or tile such that only material flowing through the hopper or chute causes a portion of the flexible fin or flap downstream of the line of deflection to flex, where flexing of the flexible fin or flap is not caused by an external airflow.

22. A flexible liner for a material handling device, comprising:
a plurality of mounting devices provided at parallel, regularly spaced, locations on a wall of the material handling device; and
a plurality of flexible liner elements having an elongate portion and a flexible portion, the elongate portion being releasably engaged with a respective one of the mounting devices, the flexible portion extending from the elongate body at an acute angle to a wall of the material handling device in a downstream direction of flow of the material, the elongate portion being secured to the wall so that the flexible portion of one liner element overlies, and is in contact with, the elongate portion of an adjacent liner element in the downstream direction, and in use, the elongate portion of the adjacent flexible liner element forms a line of deflection for the or each flexible fin or flap of the one liner panel or tile, the line of deflection forming a fulcrum within the or each flexible fin or flap such that only material flowing through the hopper or chute causes a portion of the flexible fin or flap downstream of the line of deflection to flex.

\* \* \* \* \*

UNITED STATES PATENT AND TRADEMARK OFFICE
CERTIFICATE OF CORRECTION

| | | |
|---|---|---|
| PATENT NO. | : 7,938,244 B2 | Page 1 of 1 |
| APPLICATION NO. | : 11/747299 | |
| DATED | : May 10, 2011 | |
| INVENTOR(S) | : Neville et al. | |

It is certified that error appears in the above-identified patent and that said Letters Patent is hereby corrected as shown below:

ON THE TITLE PAGE

Patent states U.S. Cl. 193/25 R, should be -- U.S. Cl. 193/002.00R --.

| | |
|---|---|
| Column 6, line 43: | Delete "claim" and replace with -- Claim --. |
| Column 6, line 49: | Delete "claim" and replace with -- Claim --. |
| Column 6, line 52: | Delete "claim" and replace with -- Claim --. |
| Column 6, line 56: | Delete "claim" and replace with -- Claim --. |
| Column 6, line 60: | Delete "claim" and replace with -- Claim --. |
| Column 6, line 64: | Delete "claim" and replace with -- Claim --. |
| Column 7, line 6: | Delete "claim" and replace with -- Claim --. |
| Column 7, line 9: | Delete "claim" and replace with -- Claim --. |
| Column 7, line 11: | Delete "10 mm" and replace with --10mm --. |
| Column 7, line 13: | Delete "claim" and replace with -- Claim --. |
| Column 7, lines 14-15: | Delete "600-1000 mm" and replace with -- 600-1000mm --. |
| Column 7, line 36: | Delete "claim" and replace with -- Claim --. |
| Column 7, line 39: | Delete "claim" and replace with -- Claim --. |
| Column 7, line 43: | Delete "claim" and replace with -- Claim --. |
| Column 7, line 47: | Delete "claim" and replace with -- Claim --. |
| Column 7, line 51: | Delete "claim" and replace with -- Claim --. |
| Column 7, line 54: | Delete "claim" and replace with -- Claim --. |
| Column 7, line 56: | Delete "claim" and replace with -- Claim --. |

Signed and Sealed this
Fifth Day of July, 2011

David J. Kappos
*Director of the United States Patent and Trademark Office*